United States Patent
Zhu et al.

(10) Patent No.: US 11,864,024 B2
(45) Date of Patent: Jan. 2, 2024

(54) METHOD FOR WIRELESS COMMUNICATION AND APPARATUS

(71) Applicant: HUAWEI TECHNOLOGIES CO., LTD., Guangdong (CN)

(72) Inventors: Huiying Zhu, Shanghai (CN); Rongkuan Liu, Shanghai (CN); Yuanjie Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 17/392,038

(22) Filed: Aug. 2, 2021

(65) Prior Publication Data

US 2021/0368385 A1 Nov. 25, 2021

Related U.S. Application Data

(63) Continuation of application No. PCT/CN2019/113314, filed on Oct. 25, 2019.

(30) Foreign Application Priority Data

Feb. 2, 2019 (CN) .................. 201910107747.X

(51) Int. Cl.
*H04W 28/04* (2009.01)
*H04L 1/16* (2023.01)
*H04L 1/1607* (2023.01)

(52) U.S. Cl.
CPC ........... *H04W 28/04* (2013.01); *H04L 1/1607* (2013.01)

(58) Field of Classification Search
None
See application file for complete search history.

(56) References Cited

U.S. PATENT DOCUMENTS

2010/0290383 A1 11/2010 Wu et al.
2018/0254877 A1* 9/2018 Wang .................... H04L 1/1854
(Continued)

FOREIGN PATENT DOCUMENTS

CN 108011696 A 5/2018
CN 108365922 A 8/2018
(Continued)

OTHER PUBLICATIONS

3GPP TS 36.212 V15.4.0 (Dec. 2018), 3rd Generation Partnership Project; Technical Specification Group Radio Access Network; Evolved Universal Terrestrial Radio Access (E-UTRA); Multiplexing and channel coding(Release 15), 247 pages.
(Continued)

*Primary Examiner* — Hong Shao
(74) *Attorney, Agent, or Firm* — HUAWEI TECHNOLOGIES CO., LTD.

(57) ABSTRACT

This application provides a method for wireless communication and an apparatus. The method includes: receiving, by a communication device, L pieces of first data, and determining reception statuses for the L pieces of first data; receiving, by the communication device, second data, and generating feedback information based on the reception statuses for the L pieces of first data and the second data, where the feedback information indicates one or more reception statuses for M pieces of first data, the M pieces of first data are included in the L pieces of first data; and the second data is data obtained after N pieces of first data are encoded, the N pieces of first data are included in the L pieces of first data; and sending, by the communication device, the feedback information.

17 Claims, 4 Drawing Sheets

(56) References Cited

U.S. PATENT DOCUMENTS

2018/0302128 A1    10/2018    Akkarakaran et al.
2021/0409173 A1*   12/2021    Chatterjee ............. H04L 5/0051

FOREIGN PATENT DOCUMENTS

| CN | 108809533 A  | 11/2018 |
| CN | 109005014 A  | 12/2018 |
| CN | 109150413 A  | 1/2019  |
| WO | 2010096949 A1 | 9/2010 |
| WO | 2018076350 A1 | 5/2018 |
| WO | 2018171649 A1 | 9/2018 |

OTHER PUBLICATIONS

3GPP TS 36.213 V15.4.0 (Dec. 2018), 3rd Generation Partnership Project; Technical Specification Group Radio Access Network; Evolved Universal Terrestrial Radio Access (E-UTRA); Physical layer procedures(Release 15), 551 pages.

KT Corp: "Considerations on HARQ for CBG-based transmission", 3GPP Draft; R1-1716571, Sep. 17, 2017, XP051340023, total 5 pages.

Li et al: "Compressed Multicast Retransmission in LTE-A eMBMS", 2010 IEEE Vehicular Technology Conference (VTC 2010-SPRING)—May 16-19, 2010—Taipei, Taiwan, IEEE, US, May 16, 2010 (May 16, 2010), pp. 1-5, XP031696040.

Qualcomm Incorporated: "Outer Code Design for URLLC and eMBB Multiplexing", 3GPP Draft; R1-1702641, Feb. 17, 2017, pp. 1-10, XP051221496.

* cited by examiner

METHOD FOR WIRELESS COMMUNICATION AND APPARATUS

CROSS-REFERENCE TO RELATED APPLICATIONS

This application is a continuation of International Application No. PCT/CN2019/113314, filed on Oct. 25, 2019, which claims priority to Chinese Patent Application No. 201910107747.X, filed on Feb. 2, 2019. The disclosures of the aforementioned applications are hereby incorporated by reference in their entireties.

TECHNICAL FIELD

This application relates to the field of communication technologies, and in particular, to a method for wireless communication and an apparatus.

BACKGROUND

In an information feedback mechanism of a wireless communication network, when successfully receiving or unsuccessfully receiving data, a receive node may feedback a reception status (for example, successful reception or unsuccessful reception) for the data to a send node that sends the data, to assist the send node in determining whether to retransmit the data. A main problem of the foregoing information feedback mechanism is that the receive node can feed back only a reception status for coded data or a coded data group, and consequently cannot provide richer feedback information to the send node. As a result, data transmission efficiency may be reduced. Therefore, how to design a more flexible information feedback manner to improve data transmission efficiency becomes an urgent problem to be resolved.

SUMMARY

Embodiments of this application provide a method for wireless communication and an apparatus.

According to a first aspect, an embodiment of this application provides a method for wireless communication, including: A communication device receives L pieces of first data, and determines reception statuses for the L pieces of first data, where L is an integer greater than 1. The communication device receives second data, and generates feedback information based on the reception statuses for the L pieces of first data and the second data, where the feedback information indicates one or more reception statuses for M pieces of first data, the M pieces of first data are included in the L pieces of first data, and M is a positive integer less than or equal to L. The second data is data obtained after N pieces of first data are encoded, the N pieces of first data are included in the L pieces of first data, and N is a positive integer less than or equal to L. The communication device sends the feedback information. The communication device may be a terminal or may be a network device.

In the method provided in this embodiment of this application, the communication device may feedback a reception status for original data (namely, the first data) in coded data (namely, the second data). Therefore, richer feedback information can be provided for a send node that sends the coded data, so that the send node can more properly organize to-be-sent data in subsequent data sending, to reduce unnecessary retransmission and improve data transmission efficiency.

In some possible implementations of the first aspect, the feedback information indicates that the communication device correctly receives the M pieces of first data. For example, when determining the reception statuses for the L pieces of first data, the communication device determines that the L1 pieces of first data are correctly received, where L1 is a positive integer less than or equal to L. When receiving the second data, the communication device decodes the second data by using L2 pieces of first data in the L1 pieces of first data, to obtain L3 pieces of first data that are in the L pieces of first data and that are different from the L1 pieces of first data, where the L2 pieces of first data are included in the N pieces of first data, L2 is a positive integer less than or equal to L1, L3 is a nonnegative integer less than or equal to L, and a sum of L1 and L3 is less than or equal to L. When generating, based on the reception statuses for the L pieces of first data and the second data, the feedback information indicating the one or more reception statuses for the M pieces of first data, the communication device generates feedback information indicating that the L3 pieces of first data are correctly received, where L3=M; or generates feedback information indicating that the L1+L3 pieces of first data are correctly received, where L1+L3=M. Optionally, L2 and L3 satisfy L2+L3=N. Optionally, L2 and L3 satisfy L3=1, and L2=N−1.

In some possible implementations of the first aspect, the feedback information indicates that the communication device does not correctly receive M1 pieces of first data, and indicates that the communication device correctly receives M2 pieces of first data, where M1 and M2 are integers greater than or equal to 0, and M1+M2=M. For example, when determining the reception statuses for the L pieces of first data, the communication device determines that the L1 pieces of first data are correctly received, where L1 is a positive integer less than or equal to L. When receiving the second data, the communication device decodes the second data by using L2 pieces of first data in the L1 pieces of first data, to obtain L3 pieces of first data that are in the L pieces of first data and that are different from the L1 pieces of first data, where the L2 pieces of first data are included in the N pieces of first data, L2 is a positive integer less than or equal to L1, L3 is a nonnegative integer less than or equal to L, and a sum of L1 and L3 is less than or equal to L. When generating, based on the reception statuses for the L pieces of first data and the second data, the feedback information indicating the one or more reception statuses for the M pieces of first data, the communication device generates feedback information indicating that the L3 pieces of first data are correctly received and feedback information indicating that L−L1−L3 pieces of first data are not correctly received, where L3=M2, and L−L1−L3=M1; or the communication device generates feedback information indicating that the L1+L3 pieces of first data are correctly received and feedback information indicating that L−L1−L3 pieces of first data are not correctly received, where L1+L3=M2, and L−L1−L3=M1. Optionally, L2 and L3 satisfy L2+L3=N. Optionally, L2 and L3 satisfy L3=1, and L2=N−1.

In some possible implementations of the first aspect, the feedback information indicates that the communication device does not correctly receive the M pieces of first data.

With reference to any one of the first aspect or the possible implementations of the first aspect, in some possible implementations of the first aspect, the communication device receives the second data and at least one piece of third data, where the third data is data obtained after K pieces of first data are encoded, the K pieces of first data are included in the L pieces of first data, and K is a positive integer less than or equal to L. The communication device generates the feedback information based on the reception statuses for the L pieces of first data, the second data, and the at least one piece of third data. Optionally, the communication device receives the second data and the at least one piece of third data based on identification information.

With reference to any one of the first aspect or the possible implementations of the first aspect, in some possible implementations of the first aspect, the communication device sends the feedback information in a time unit identified as T1, where T1 satisfies T1=(T2+T0) mod TN, T2 identifies a time unit in which the communication device receives the second data, T0 and TN are positive integers, and mod represents modulo.

With reference to any one of the first aspect or the possible implementations of the first aspect, in some possible implementations of the first aspect, the communication device receives indication information, where the indication information indicates the communication device to send the feedback information.

When the indication information in the foregoing implementation is used, different data acknowledgement feedback formats may be used for different types of transport blocks, so that a transmission resource can be saved, and the transmission efficiency can be improved.

According to a second aspect, an embodiment of this application provides a method for wireless communication, including: A communication device sends L pieces of first data, where L is an integer greater than 1. The communication device sends second data, where the second data is data obtained after N pieces of first data are encoded, the N pieces of first data are included in the L pieces of first data, and N is a positive integer less than or equal to L. The communication device receives feedback information, where the feedback information indicates one or more reception statuses for M pieces of first data, the M pieces of first data are included in the L pieces of first data, and M is a positive integer less than or equal to L. The communication device may be a network device, or may be a terminal.

In the method provided in this embodiment of this application, the communication device may obtain a reception status for original data (namely, the first data) in coded data (namely, the second data). Therefore, the communication device can more properly organize to-be-sent data in subsequent data sending, to reduce unnecessary retransmission and improve data transmission efficiency.

In some possible implementations of the second aspect, the feedback information indicates that the M pieces of first data are not correctly received.

In some possible implementations of the second aspect, the feedback information indicates that the M pieces of first data are correctly received.

In some possible implementations of the second aspect, the feedback information indicates that M1 pieces of first data are not correctly received, and indicates that M2 pieces of first data are correctly received, where M1 and M2 are integers greater than or equal to 0, and M1+M2=M.

With reference to any one of the second aspect or the possible implementations of the second aspect, in some possible implementations of the second aspect, the communication device sends the second data and at least one piece of third data, where the third data is data obtained after K pieces of first data are encoded, the K pieces of first data are included in the L pieces of first data, and K is a positive integer less than or equal to L. Optionally, the communication device processes the second data and the at least one piece of third data by using identification information, and sends the second data and the at least one piece of third data.

With reference to any one of the second aspect or the possible implementations of the second aspect, in some possible implementations of the second aspect, the communication device receives the feedback information in a time unit identified as T1, where T1 satisfies T1=(T2+T0) mod TN, T2 identifies a time unit in which the communication device sends the second data, T0 and TN are positive integers, and mod represents modulo.

With reference to any one of the second aspect or the possible implementations of the second aspect, in some possible implementations of the second aspect, the communication device sends indication information, where the indication information is used to request or trigger the feedback information.

When the indication information in the foregoing implementation is used, different data acknowledgement feedback formats may be used for different types of transport blocks, so that a transmission resource can be saved, and the transmission efficiency can be improved.

According to a third aspect, an embodiment of this application provides a communication apparatus, to implement one or more corresponding functions of the node in the first aspect or the second aspect. The communication apparatus includes a corresponding unit or component configured to perform the foregoing method. The unit included in the communication apparatus may be implemented by using software and/or hardware. For example, the communication apparatus may be a terminal, a network device (for example, a base station), or a chip, chip system, processor, or the like that can support a terminal or network device in implementing the foregoing functions.

According to a fourth aspect, this application provides a communication apparatus, including a processor. The processor is coupled to a memory, and the memory is configured to store a program or instructions. When the program or the instructions are executed by the processor, the communication apparatus is enabled to implement the method according to the first aspect or the second aspect.

According to a fifth aspect, this application provides a storage medium. The storage medium stores a computer program or instructions, and when the computer program or the instructions are executed, a computer is enabled to perform the method according to the first aspect or the second aspect.

According to a sixth aspect, an embodiment of this application provides a chip system, including a processor. The processor is coupled to a memory, and the memory is configured to store a program or instructions. When the program or the instructions are executed by the processor, the chip system is enabled to implement the method according to the first aspect or the second aspect.

According to a seventh aspect, an embodiment of this application provides a communication system, including a communication apparatus configured to perform the method according to the first aspect or the second aspect.

DESCRIPTION OF EMBODIMENTS

Figure 1:
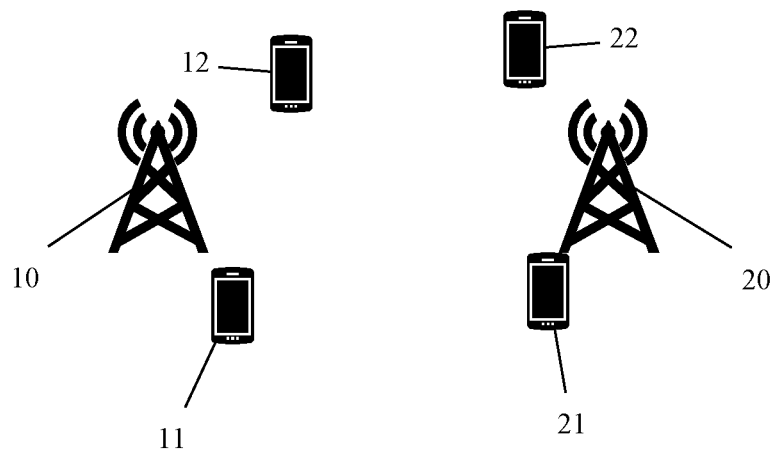
FIG. 1 is a schematic diagram of a communication system that is used according to an embodiment of this application.

A method for wireless communication and an apparatus that are provided in embodiments of this application may be used in a communication system. FIG. 1 is a schematic structural diagram of a communication system. The communication system includes one or more network devices (where for clarity, a network device 10 and a network device 20 are shown in the figure), and one or more terminal devices that communicate with the one or more network devices. In FIG. 1, a terminal device 11 and a terminal device 12 communicate with the network device 10, and a terminal device 21 and a terminal device 22 communicate with the network device 20. It may be understood that the network devices and the terminal devices may also be referred to as communication devices.

The technologies described in the embodiments of the present invention may be used in various communication systems, for example, 2G, 3G, 4G, 4.5G, and 5G communication systems, a system in which a plurality of communication systems are integrated, or a future evolved network. The communication systems include, for example, a long term evolution (long term evolution, LTE) system, a new radio (new radio, NR) system, a wireless fidelity (wireless-fidelity, WiFi) system, a cellular system related to the 3rd generation partnership project (3rd generation partnership project, 3GPP), and another communication system of this type.

Figure 2:
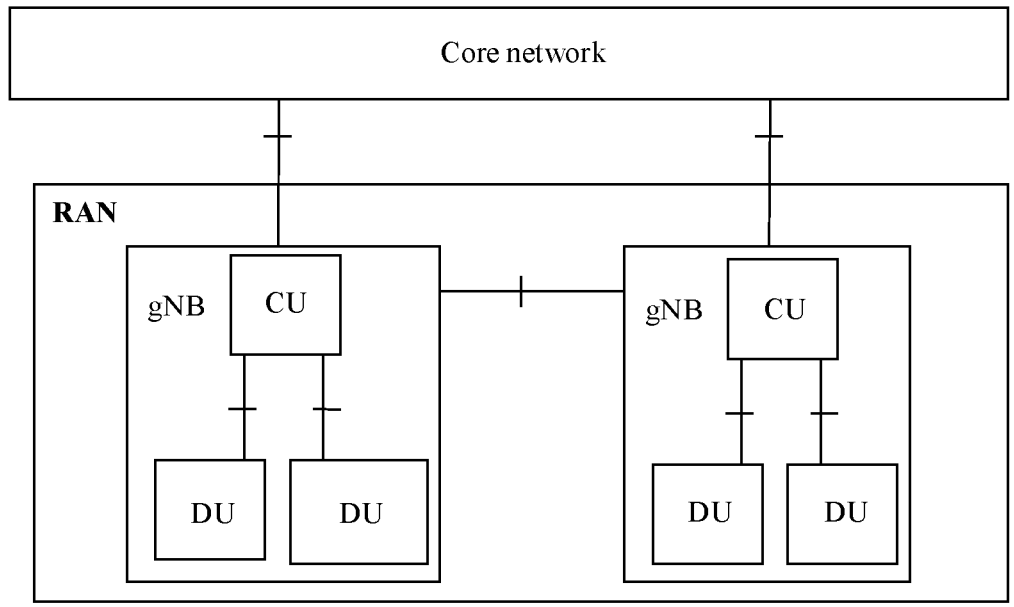
FIG. 2 is a schematic diagram of an example of an architecture of a communication system.

FIG. 2 is a schematic diagram of an example of a possible architecture of a communication system. As shown in FIG. 2, a network device in a radio access network (radio access network, RAN) is a base station (such as a gNodeB or a gNB) with an architecture in which a centralized unit (centralized unit, CU) and a distributed unit (distributed unit, DU) are separated. The RAN may be connected to a core network (for example, an LTE core network or a 5G core network). The CU and the DU may be understood as division of the base station from a logical function perspective. The CU and the DU may be physically separated or physically deployed together. A plurality of DUs may share one CU. One DU may alternatively be connected to a plurality of CUs (not shown in the figure). The CU and the DU may be connected through an interface, for example, an F1 interface. The CU and the DU may be obtained through division based on protocol layers of a wireless network. For example, functions of a packet data convergence protocol (packet data convergence protocol, PDCP) layer and a radio resource control (radio resource control, RRC) layer are distributed to the CU, but functions of a radio link control (radio link control, RLC) layer, a media access control (media access control, MAC) layer, and a physical (physical) layer are distributed to the DU. It may be understood that, division into processing functions of the CU and the DU based on the protocol layers is merely an example, and the processing functions of the CU and the DU may alternatively be obtained through division in another manner. For example, the CU or the DU may be obtained through division to have functions of more protocol layers. For example, the CU or the DU may alternatively be obtained through division to have some processing functions of protocol layers. In a design, some functions of the RLC layer and functions of a protocol layer above the RLC layer are distributed to the CU, and remaining functions of the RLC layer and functions of a protocol layer below the RLC layer are distributed to the DU. In another design, functions of the CU or the DU may alternatively be obtained through division based on a service type or another system requirement. For example, division is performed based on a delay. Functions whose processing time needs to meet a delay requirement are distributed to the DU, and functions that do not need to meet the delay requirement are distributed to the CU. A network architecture shown in FIG. 2 may be used for a 5G communication system, and may alternatively share one or more components or resources with an LTE system. In another design, the CU may alternatively have one or more functions of a core network. One or more CUs may be disposed in a centralized manner or a separated manner. For example, the CUs may be disposed on a network side for centralized management. The DU may have a plurality of radio frequency functions, and the radio frequency functions may be remotely set.

The function of the CU may be implemented by one entity, or may be used to further separate a control plane (CP) and a user plane (UP). To be specific, the control plane of the CU (CU-CP) and the user plane of the CU (CU-UP) may be implemented by different function entities, and the CU-CP and the CU-UP may be coupled to the DU to jointly implement a function of the base station.

It may be understood that the embodiments provided in this application are also applicable to an architecture in which the CU and the DU are not separated.

In this application, the network device may be any device having a wireless transceiver function. The network device includes but is not limited to: an evolved NodeB (NodeB or eNB or e-NodeB, evolutional Node B) in LTE, a base station (gNodeB or gNB) or a transmission reception point (transmission receiving point/transmission reception point, TRP) in NR, a base station that subsequently evolves in 3GPP, an access node in a Wi-Fi system, a wireless relay node, a wireless backhaul node, or the like. The base station may be a macro base station, a micro base station, a picocell base station, a small cell, a relay station, a balloon station, or the like. A plurality of base stations may support the aforementioned networks of a same technology, or may support the aforementioned networks of different technologies. The base station may include one or more co-site or non-co-site TRPs. The network device may alternatively be a radio controller, a CU, and/or a DU in a cloud radio access network (cloud radio access network, CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with a terminal device, or may communicate with a terminal device via a relay station. The terminal device may communicate with a plurality of base stations using different technologies. For example, the terminal device may communicate with a base station supporting an LTE network, may communicate with a base station supporting a 5G network, and may further support a dual connection to a base station in an LTE network and a base station in a 5G network.

The terminal is a device having a wireless transceiver function. The terminal may be deployed on land, indoor or outdoor, or may be hand-held, wearable, or vehicle-mounted; may be deployed on a water surface (for example, on a ship); or may be deployed in the air (for example, on an airplane, a balloon, or a satellite). The terminal may be a mobile phone (mobile phone), a tablet (Pad), a computer with a wireless transceiver function, a virtual reality (virtual reality, VR) terminal device, an augmented reality (augmented reality, AR) terminal device, a wireless terminal in industrial control (industrial control), a vehicle-mounted terminal device, a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), a wearable terminal device, or the like. An application scenario is not limited in the embodiments of this application. The terminal sometimes may also be referred to as a terminal device, user equipment (user equipment, UE), an access terminal device, a vehicle-mounted terminal, an industrial control terminal, a UE unit, a UE station, a mobile station, a mobile station, a remote station, a remote terminal device, a mobile device, a UE terminal device, a terminal device, a wireless communication device, a UE agent, a UE apparatus, or the like. The terminal may be fixed or movable.

In an information feedback mechanism of a wireless communication network, when successfully receiving or unsuccessfully receiving data, a receive node (for example, a terminal) may feed back a reception status (for example, successful reception or unsuccessful reception) for the data to a send node (for example, a network device or another terminal) that sends the data, to assist the send node in determining whether to retransmit the data. A main problem of the foregoing information feedback mechanism is that the receive node can feed back only a reception status for coded data or a coded data group, and consequently cannot provide richer feedback information to the send node. As a result, data transmission efficiency may be reduced. Therefore, how to design a more flexible information feedback manner to improve data transmission efficiency becomes an urgent problem to be resolved.

In a method provided in the embodiments of this application, a receive node that receives data may feed back a reception status for original data in coded data or a coded data group. Therefore, richer feedback information can be provided for a send node that sends the coded data or the coded data group, so that the send node can more properly organize to-be-sent data in subsequent data sending, to reduce unnecessary retransmission and improve the data transmission efficiency.

The following describes the technical solutions of this application in detail by using specific embodiments with reference to the accompanying drawings. The following embodiments and implementations may be combined with each other, and same or similar concepts or processes may not be described repeatedly in some embodiments. It should be understood that a function explained in this application may be implemented by using an independent hardware circuit, software running in combination with a processor/microprocessor or a general-purpose computer, an application-specific integrated circuit, and/or one or more digital signal processors. When described as a method, this application may alternatively be implemented in a computer processor and a memory coupled to the processor.

Figure 3:
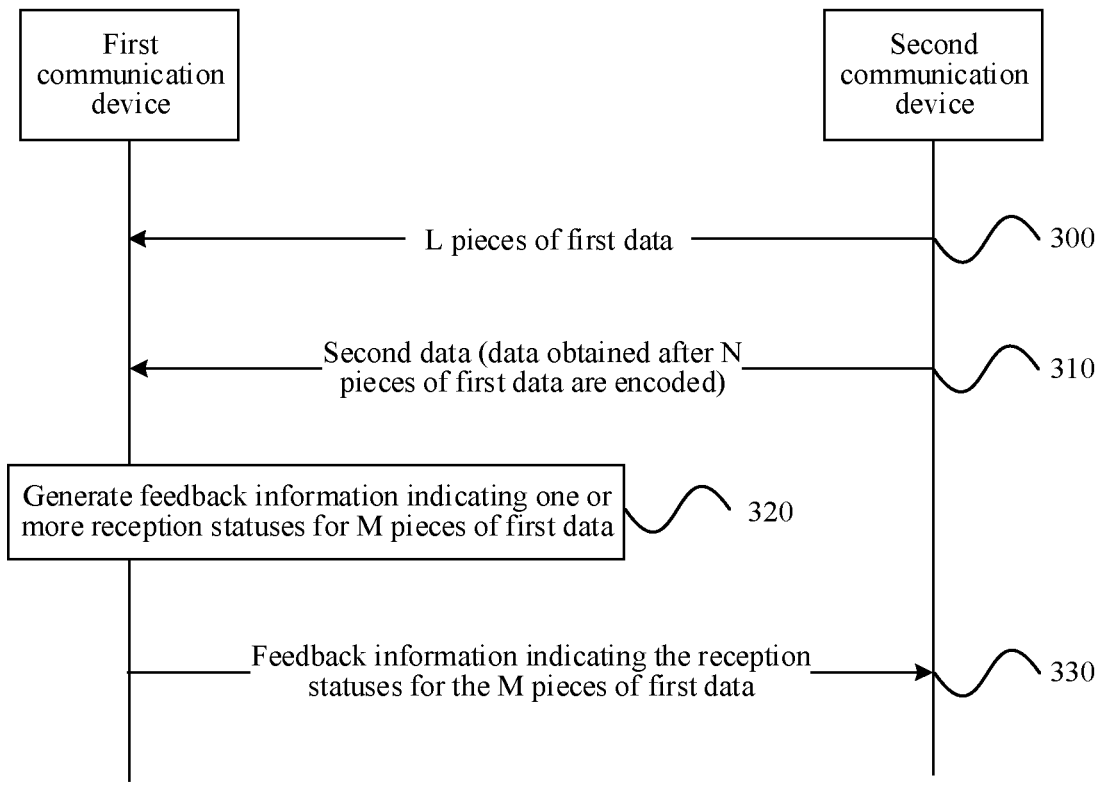
FIG. 3 is a schematic interaction diagram of a feedback information sending/receiving method according to an embodiment of this application.

FIG. 3 is a schematic interaction diagram of a feedback information sending/receiving method according to an embodiment of this application. A first communication device schematically shown in FIG. 3 is a terminal or a network device. A second communication device schematically shown in FIG. 3 is a network device or a terminal. As shown in FIG. 3, the method in this embodiment may include the following parts.

Part 300: The second communication device sends L pieces of first data, and the first communication device receives the L pieces of first data, where L is an integer greater than 1. That is, the first communication device receives two or more pieces of first data from the second communication device. A destination device of the L pieces of first data is the first communication device, or a destination device of a part of first data in the L pieces of first data is the first communication device and a destination device of other first data in the L pieces of first data is one or more communication devices other than the first communication device, or a destination device of the L pieces of first data is not the first communication device.

The first data in this application sometimes may also be referred to as initial transmission data, new transmission data, original data, source data, uncoded data, an initial transmission transport block (transport block, TB), a new transmission transport block, an original transport block, a source transport block, an uncoded transport block, an initial transmission code block (code block, CB), a new transmission code block, an original code block, a source code block, an uncoded code block, an initial transmission code block group (code block group, CBG), a new transmission code block group, an original code block group, a source code block group, an uncoded code block group, an initial transmission packet, a new transmission packet, an original packet, a source packet, or an uncoded packet.

In part 300, optionally, the first communication device determines reception statuses for the L pieces of first data.

That the communication device determines a reception status for data in this application may be understood as that the communication device determines that the data is correctly received or determines that the data is not correctly received. That the data is not correctly received may also be understood as that the data is incorrectly received or the data is not received.

Part 310: The second communication device sends second data, and the first communication device receives the second data, where the second data is data obtained after N pieces of first data are encoded, the N pieces of first data are included in the L pieces of first data, and N is a positive integer less than or equal to L. It may be understood that the second data in this application sometimes may also be referred to as coded data, a coded transport block, a coded code block, a coded code block group, or a coded packet.

In part 310, to improve transmission efficiency, the N pieces of first data in the L pieces of first data are encoded to generate the second data, and then transmission of the second data is performed. It may be understood that the foregoing encoding may be index coding, network coding, fountain encoding, outer coding, rateless coding, or superposition coding, or may be other coding. This is not limited in the embodiments of this application.

That the communication device receives data in this application may be understood as that the communication device receives a shared channel (for example, a physical downlink shared channel (physical downlink shared channel, PDSCH) or a physical sidelink shared channel (physical sidelink shared channel, PSSCH)) that carries the data, or may be understood as that the communication device receives a control channel (for example, a physical downlink control channel (physical downlink control channel, PDCCH) or a physical sidelink control channel (physical sidelink control channel, PSCCH)) that corresponds to the data and a shared channel that carries the data. The control channel corresponding to the data carries control information, and the control information includes a parameter (for example, a resource allocation parameter and/or a modulation and coding parameter) used to receive the data carried on the foregoing shared channel.

In part 310, optionally, the second data includes identification information, or a control channel corresponding to the second data includes identification information. In a possible implementation in which the control channel corresponding to the second data includes the identification information, control information carried on the control channel corresponding to the second data includes the identification information. In another possible implementation in which the control channel corresponding to the second data includes the identification information, the control channel is scrambled by the identification information. For example, a cyclic redundancy check (cyclic redundancy check, CRC) code carried on the control channel is scrambled by the identification information. The first communication device receives the second data based on the identification information. The process may also be understood as that the first communication device detects or receives the identification information, learns that the second data is data obtained after the foregoing several pieces of first data are encoded, and then performs part 320 and part 330 based on the reception statuses for the L pieces of first data and the second data. Optionally, the identification information is predefined, or is configured/indicated by the network device.

The identification information may be a group identifier. The group identifier identifies a communication device group, and the communication device group includes two or more communication devices. In a possible implementation, the communication device group includes L communication devices. Optionally, the L communication devices include the first communication device.

Part 320: The first communication device generates feedback information indicating one or more reception statuses for M pieces of first data, where the M pieces of first data are included in the L pieces of first data, and M is a positive integer less than or equal to L.

Optionally, the feedback information includes M bits (for example, a bitmap (bitmap) with a length of M), and the M bits respectively indicate one or more reception statuses for the M pieces of first data. Alternatively, the feedback information includes one or more identifiers corresponding to the M pieces of first data, and the identifiers respectively indicate that the M pieces of first data are correctly received or are not correctly received.

Optionally, the feedback information indicates that the first communication device correctly receives the M pieces of first data; the feedback information indicates that the first communication device does not correctly receive the M pieces of first data; or the feedback information indicates that the first communication device does not correctly receive M1 pieces of first data, and indicates that the first communication device correctly receives M2 pieces of first data, where M1 and M2 are integers greater than or equal to 0, and M1+M2=M.

It may be understood that the feedback information may include an acknowledgement (acknowledgement, ACK) and/or a negative acknowledgement (negative acknowledgement, NACK). The ACK represents that data is correctly received, and the NACK represents that data is not correctly received.

In part 320, optionally, the first communication device generates the feedback information based on the reception statuses for the L pieces of first data and the second data.

In a possible implementation in which the first communication device generates the feedback information based on the reception statuses for the L pieces of first data and the second data, the first communication device correctly receives L1 pieces of first data in the L pieces of first data, where L1 is a positive integer less than or equal to L. The first communication device decodes the second data by using L2 pieces of first data in the L1 pieces of first data, to obtain L3 pieces of first data that are in the L pieces of first data and that are different from the L1 pieces of first data, where the L2 pieces of first data are included in the N pieces of first data, L2 is a positive integer less than or equal to L1, L3 is a nonnegative integer less than or equal to L, and a sum of L1 and L3 is less than or equal to L. The first communication device generates feedback information indicating that the L3 pieces of first data are correctly received, where L3=M; the first communication device generates feedback information indicating that the L1+L3 pieces of first data are correctly received, where L1+L3=M; the first communication device generates feedback information indicating that L−L1−L3 pieces of first data (which may also be understood as first data, in the L pieces of first data, other than the L1 pieces of first data and the L3 pieces of first data) are not correctly received, where L−L1−L3=M; the first communication device generates feedback information indicating that the L3 pieces of first data are correctly received, and feedback information indicating that the L−L1−L3 pieces of first data (which may also be understood as first data, in the L pieces of first data, other than the L1 pieces of first data and the L3 pieces of first data) are not correctly received, where L3=M2, L−L1−L3=M1, and M1+M2=M; or the first communication device generates feedback information indicating that the L1+L3 pieces of first data are correctly received, and feedback information indicating that L−L1−L3 pieces of first data (which may also be understood as first data, in the L pieces of first data, other than the L1 pieces of first data and the L3 pieces of first data) are not correctly received, where L1+L3=M2, L−L1−L3=M1, and M1+M2=M.

Optionally, L2 and L3 satisfy N=L2+L3, to be specific, a sum of L2 and L3 is equal to a quantity of pieces of original first data included in the second data.

Optionally, L2 and L3 satisfy L3=1 and L2=N−1, to be specific, L2 is equal to a quantity of pieces of original first data included in the second data minus 1, and L3 is equal to 1.

To obtain L3 pieces of first data that are in the L pieces of first data and that are different from the L1 pieces of first data may also be understood as to correctly receive the L3 pieces of first data that are in the L pieces of first data and that are different from the L1 pieces of first data. The L3 pieces of first data may also be understood as newly added correctly-received first data, and the L1+L3 pieces of first data may also be understood as accumulated correctly-received first data.

That the first communication device decodes the second data by using L2 pieces of first data in the L1 pieces of first data may also be understood as that the first communication device selects the L2 pieces of first data from the L1 pieces of first data to decode the second data. For example, the first communication device may blindly select L2 pieces of first data from the L1 pieces of first data to attempt to decode the second data, until the decoding succeeds and the L3 pieces of first data that are in the L pieces of first data and that are different from the L1 pieces of first data are obtained.

Part 330: The first communication device sends the feedback information, and the second communication device receives the feedback information. It may be understood that the sending or the receiving of the feedback information may alternatively be sending or receiving of information generated after the feedback information is preprocessed. The preprocessing includes one or more of scrambling, modulation, coding, rate matching, or precoding. Optionally, the first communication device may further feed back the identification information in part 310.

In an optional implementation of part 330, the first communication device sends the feedback information in a time unit identified as T1, where T1 satisfies T1=T2+T0, T2 identifies a time unit in which the first communication device receives the second data, T0 is a positive integer, and mod represents modulo. Optionally, T0 is predefined, or is configured by the network device by using higher layer signaling (RRC signaling, or a MAC control element (control element, CE)).

In another optional implementation of part 330, the first communication device sends the feedback information in a time unit identified as T1, where T1 satisfies T1=(T2+T0) mod TN, T2 identifies a time unit in which the first communication device receives the second data, T0 and TN are positive integers, and mod represents modulo. Optionally, T0 and TN are predefined, or are configured by the network device by using higher layer signaling (RRC signaling or a MAC CE).

In the method provided in this embodiment of this application, a receive node (namely, the first communication device) that receives data may feed back a reception status for original data (namely, the first data) in coded data (namely, the second data). Therefore, richer feedback information can be provided for a send node (namely, the second communication device) that sends the coded data, so that the send node can more properly organize to-be-sent data in subsequent data sending, to reduce unnecessary retransmission and improve the data transmission efficiency.

In still another optional implementation of part 330, the first communication device receives indication information I1 before sending the feedback information, and the indication information I1 indicates the first communication device to send the feedback information. The indication information I1 may be understood as a switch that enables the first communication device to send the feedback information. The indication information I1 may be explicitly carried in higher layer signaling (for example, RRC signaling or a MAC CE), or may be explicitly carried in physical layer control information (for example, downlink control information (downlink control information, DCI)). For example, the indication information I1 may be included in a new data indicator (new data indicator, NDI) field in the DCI, may be included in a code block group transmission information (code block group transmission information CBGTI) field in the DCI, or may be included in a newly added field in the DCI. The indication information I1 may alternatively be implicitly carried in physical layer control information (for example, DCI). For example, a physical resource R1 carrying the DCI that includes the indication information I1 may correspond to the indication information I1. In other words, when detecting the DCI on the physical resource R1, the first communication device may determine that the indication information I1 is received.

Optionally, if the first communication device does not receive the indication information I1 or receives indication information I2 that is different from the indication information I1, the first communication device may not send the feedback information, or may send feedback information including other content (for example, feedback information including a reception status for the second data).

When the indication information I1 is used, different data acknowledgement feedback formats may be used for different types of transport blocks, so that a transmission resource can be saved, and the transmission efficiency can be improved.

In part 310, optionally, the second communication device sends the second data and P pieces of third data, and the first communication device receives the second data and the P pieces of third data, where the P pieces of third data are data obtained after K pieces of first data are encoded, the K pieces of first data are included in the L pieces of first data, K is a positive integer less than or equal to L, and P is an integer greater than or equal to 1. Optionally, P is predefined, or is configured by the network device by using higher layer signaling (RRC signaling or a MAC CE). It may be understood that the third data in this application sometimes may also be referred to as coded data, a coded transport block, a coded code block, a coded code block group, or a coded packet. Correspondingly, in part 320, optionally, the first communication device generates the feedback information based on the reception statuses for the L pieces of first data, the second data, and the P pieces of third data. Both the P pieces of third data and the second data are coded data. Therefore, in this implementation, after a plurality of pieces of coded data are received, a reception status for original data in the coded data may be fed back, thereby reducing feedback overheads. Optionally, in part 330, the first communication device sends the feedback information in the time unit identified as T1. T1 satisfies T1=(T2+T0), T1=(T2+T0) mod TN, T1=(T3+T0), or T1=(T3+T0) mod TN, where T3 identifies a time unit in which the first communication device receives one piece of third data in the P pieces of third data. For another parameter, refer to the foregoing descriptions of part 330.

It may be understood that the K pieces of first data in the L pieces of first data are encoded to generate the P pieces of third data. The encoding may be index coding, network coding, fountain encoding, outer coding, rateless coding, or superposition coding, or may be other coding. This is not limited in the embodiments of this application.

Optionally, the P pieces of third data include identification information or a control channel corresponding to the P pieces of third data includes identification information. For descriptions about that the P pieces of third data include the identification information or the control channel corresponding to the P pieces of third data includes the identification information, refer to the foregoing descriptions about that the second data includes the identification information or the control channel corresponding to the second data includes the identification information. It may be understood that, the identification information included in the P pieces of third data or the identification information included in the control channel corresponding to the P pieces of third data is the same as the identification information included in the second data or the identification information included in the control channel corresponding to the second data.

The second data is data obtained after N pieces of first data are encoded, and the P pieces of third data are data obtained after the K pieces of first data are encoded. A value relationship between N and K and a relationship between the N pieces of first data and the K pieces of first data are not specifically limited in this embodiment of this application. For example, N may be equal to or not equal to K. For another example, the N pieces of first data and the K pieces of first data may be the same, or may be different, or may be partially the same. A union set of the N pieces of first data and the K pieces of first data constitutes a set of R pieces of first data, the R pieces of first data are included in the L pieces of first data, and R is a positive integer less than or equal to L. The R pieces of first data may be understood as a union set of the second data and original first data that is in the P pieces of third data.

In a possible implementation in which the first communication device generates the feedback information based on the reception statuses for the L pieces of first data, the second data, and the P pieces of third data, the first communication device correctly receives L1 pieces of first data in the L pieces of first data, where L1 is a positive integer less than or equal to L. The first communication device decodes the second data and the P pieces of third data by using L2 pieces of first data in the L1 pieces of first data, to obtain L3 pieces of first data that are in the L pieces of first data and that are different from the L1 pieces of first data, where the L2 pieces of first data are included in the R pieces of first data, L2 is a positive integer less than or equal to L1, L3 is a nonnegative integer less than or equal to L, and a sum of L1 and L3 is less than or equal to L. The first communication device generates feedback information indicating that the L3 pieces of first data are correctly received, where L3=M; the first communication device generates feedback information indicating that the L1+L3 pieces of first data are correctly received, where L1+L3=M; the first communication device generates feedback information indicating that L−L1−L3 pieces of first data (which may also be understood as first data, in the L pieces of first data, other than the L1 pieces of first data and the L3 pieces of first data) are not correctly received, where L−L1−L3=M; the first communication device generates feedback information indicating that the L3 pieces of first data are correctly received, and feedback information indicating that the L−L1−L3 pieces of first data (which may also be understood as first data, in the L pieces of first data, other than the L1 pieces of first data and the L3 pieces of first data) are not correctly received, where L3=M2, L−L1−L3=M1, and M1+M2=M; or the first communication device generates feedback information indicating that the L1+L3 pieces of first data are correctly received, and feedback information indicating that L−L1−L3 pieces of first data (which may also be understood as first data, in the L pieces of first data, other than the L1 pieces of first data and the L3 pieces of first data) are not correctly received, where L1+L3=M2, L−L1−L3=M1, and M1+M2=M.

In the foregoing implementation, that the first communication device decodes the second data and the P pieces of third data by using L2 pieces of first data in the L1 pieces of first data may be understood as that the first communication device decodes the second data by using some or all of the L2 pieces of first data in the L1 pieces of first data, and decodes the P pieces of third data by using some or all of the L2 pieces of first data in the L1 pieces of first data.

Optionally, L2 and L3 satisfy R=L2+L3, to be specific, a sum of L2 and L3 is equal to a quantity of pieces of original first data included in the second data and the P pieces of third data.

To obtain L3 pieces of first data that are in the L pieces of first data and that are different from the L1 pieces of first data may also be understood as to correctly receive the L3 pieces of first data that are in the L pieces of first data and that are different from the L1 pieces of first data. The L3 pieces of first data may also be understood as newly added correctly-received first data, and the L1+L3 pieces of first data may also be understood as accumulated correctly-received first data.

That the first communication device decodes the second data and the P pieces of third data by using L2 pieces of first data in the L1 pieces of first data may also be understood as that the first communication device selects the L2 pieces of first data from the L1 pieces of first data to decode the second data. For example, the first communication device may blindly select L2 pieces of first data from the L1 pieces of first data to attempt to decode the second data and the P pieces of third data, until the decoding succeeds and the L3 pieces of first data that are in the L pieces of first data and that are different from the L1 pieces of first data are obtained.

Figure 4:
FIG. 4 is a schematic diagram of application according to an embodiment of this application.
Figure 4:

The following describes the method in this embodiment of this application with reference to an example in FIG. 4. FIG. 4 shows four terminals U1, U2, U3, and U4, and one network device B1. For example, if L=4, there are L=4 pieces of first data, which are identified as X1, X2, X3, and X4. It may be understood that a quantity of pieces of first data is not limited in this embodiment of this application. The following example describes this embodiment of this application by using an example in which a destination device of X1 is U1, a destination device of X2 is U2, a destination device of X3 is U3, and a destination device of X4 is U4. However, it may be understood that the destination devices of X1, X2, X3, and X4 are not limited in this embodiment of this application. For example, the destination devices of X1, X2, X3, and X4 may alternatively be a same device.

For example, that U2 is a first communication device and B1 is a second communication device is used as an example. It may be understood that a quantity of first communication devices is not limited in this embodiment of this application. The following describes this example in detail with reference to the schematic interaction diagram in FIG. 3.

In part 300, B1 sends the L=4 pieces of first data (X1, X2, X3, and X4), and U2 receives the L=4 pieces of first data, and determines reception statuses for the L=4 pieces of first data, as shown in the following Table 1:

TABLE 1

| X1 | X2 | X3 | X4 |
|---|---|---|---|
| Correct | Incorrect | Correct | Incorrect |

It can be learned from Table 1 that, U2 correctly receives X1 and X3 and incorrectly receives X2 and X4, that is, U2 correctly receives L1=2 pieces of first data (X1 and X3) in the 4 pieces of first data.

In part 310, B1 sends second data X5, and U2 receives the second data X5. The second data X5 is data obtained after 3 pieces of first data, namely, X1, X2, and X3, are encoded, that is, the second data X5 is data obtained after N=3 pieces of first data (X1, X2, and X3) are encoded. For example, the second data X5 satisfies a coding relationship X5=X1⊕X2⊕X3, where ⊕ represents an addition modulo 2 operation or an exclusive OR operation.

In part 320, U2 decodes the second data X5 by using L2=2 pieces of first data (X1 and X3) in the L1=2 pieces of first data (X1 and X3), to obtain L3=1 piece of first data (X2) that is in the L=4 pieces of first data (X1, X2, X3, and X4)

and that is different from the L1=2 pieces of first data (X1 and X3). For example, U2 decodes the second data X5=X1⊕X2⊕X3 by using the L2=2 pieces of first data (X1 and X3) to perform the following decoding operation: (X1⊕X3)⊕X5=(X1⊕X3)⊕(X1⊕X2⊕X3)=X2, to obtain the L3=1 piece of first data (X2) that is in the L=4 pieces of first data (X1, X2, X3, and X4) and that is different from the L1=2 pieces of first data (X1 and X3), where the L2=2 pieces of first data (X1 and X3) are included in the N=3 pieces of first data (X1, X2, and X3).

U2 generates feedback information indicating one or more reception statuses for M pieces of first data, where the M pieces of first data are included in the L=4 pieces of first data, and M is a positive integer less than or equal to L.

In a possible implementation of the feedback information, U2 generates feedback information indicating that the L3=1 piece of first data (X2) is correctly received, where M=L3=1. For example, that the feedback information includes an identifier corresponding to X2 is used as an example. Identifiers of the L=4 pieces of first data schematically shown in Table 2 are used as an example. The feedback information includes bits "01".

TABLE 2

| X1 | X2 | X3 | X4 |
|---|---|---|---|
| 00 | 01 | 10 | 11 |

In another possible implementation of the feedback information, U2 generates feedback information indicating that the L1+L3=2+1=3 pieces of first data (X1 and X3, and X2) are correctly received, where M=L1+L3=3. For example, that the feedback information includes identifiers corresponding to X1, X2, and X3 is used as an example. The identifiers of the L=4 pieces of first data schematically shown in Table 2 are used as an example. The feedback information includes bits "000110", where the first two bits indicate an identifier "00" of X1, the middle two bits indicate an identifier "01" of X2, and the last two bits indicate an identifier "10" of X3.

In another possible implementation of the feedback information, U2 generates feedback information indicating that L−L1−L3=4−2−1=1 piece of first data (X4, which may also be understood as first data, in the L=4 pieces of first data (X1, X2, X3, and X4), other than the L1=2 pieces of first data (X1 and X3) and the L3=1 piece of first data (X2)) is not correctly received, where M=L−L1−L3=1. For example, that the feedback information includes an identifier corresponding to X4 is used as an example. The identifiers of the L=4 pieces of first data schematically shown in Table 2 are used as an example. The feedback information includes bits "11".

In another possible implementation of the feedback information, U2 generates feedback information indicating that the L3=1 piece of first data (X2) is correctly received, and feedback information indicating that L−L1−L3=4−2−1=1 piece of first data (X4, which may also be understood as first data, in the L=4 pieces of first data (X1, X2, X3, and X4), other than the L1=2 pieces of first data (X1 and X3) and the L3=1 piece of first data (X2)) is not correctly received, where M2=L3=1, M1=L−L1−L3=1, and M=M1+M2=1+1=2. For example, that the feedback information includes identifiers corresponding to X2 and X4 is used as an example. The feedback information includes two data fields DF1 and DF2. One data field DF1 includes the identifier corresponding to X2, and the other data field DF2 includes the identifier corresponding to X4. The foregoing two data fields may be understood as respectively including an identifier of newly added correctly-received first data and an identifier of first data that is not correctly received. The identifiers of the L=4 pieces of first data schematically shown in Table 2 are used as an example. The data field DF1 includes bits "01", and the data field DF2 includes bits "11".

In another possible implementation of the feedback information, U2 generates feedback information indicating that the L1+L3=2+1=3 pieces of first data (X1 and X3, and X2) are correctly received, and feedback information indicating that L−L1−L3=4−2−1=1 piece of first data (X4, which may also be understood as first data, in the L=4 pieces of first data (X1, X2, X3, and X4), other than the L1=2 pieces of first data (X1 and X3) and the L3=1 piece of first data (X2)) is not correctly received, where M2=L1+L3=3, M1=L−L1−L3=1, and M=M1+M2=4. For example, that the feedback information includes identifiers corresponding to X1, X2, X3, and X4 is used as an example. The feedback information includes two data fields DF1 and DF2. One data field DF1 includes the identifiers corresponding to X1, X2, and X3, and the other data field DF2 includes the identifier corresponding to X4. The foregoing two data fields may be understood as respectively including an identifier of accumulated correctly-received first data and an identifier of first data that is not correctly received. The identifiers of the L=4 pieces of first data schematically shown in Table 2 are used as an example. The data field DF1 includes bits "000110", where the first two bits indicate an identifier "00" of X1, the middle two bits indicate an identifier "01" of X2, and the last two bits indicate an identifier "10" of X3. The data field DF2 includes bits "11". For another example, the feedback information includes a bitmap whose length is M=4. The bitmap may be "1110", where the first three bits "1" represent that X1, X2, and X3 are correctly received, and the last bit "0" represents that X4 is not correctly received. The bitmap may alternatively be "0001". The first three bits "0" indicate that X1, X2, and X3 are correctly received, and the last bit "1" indicates that X4 is not correctly received.

In part 330, U2 sends the feedback information, and B1 receives the feedback information. Optionally, U2 may send the feedback information in a time unit identified as T1, where T1 satisfies one of the following:

T1=T2+T0, where T2 identifies a time unit in which U2 receives the second data X5, T0 is a positive integer, and mod represents modulo; or T1 satisfies T1=(T2+T0) mod TN, where T2 identifies a time unit in which U2 receives the second data X5, T0 and TN are positive integers, and mod represents modulo.

T0 and TN are predefined, or are configured by the network device by using higher layer signaling (RRC signaling or a MAC CE).

In another possible implementation of part 310, B1 sends the second data X5 and P=1 piece of third data X6, and U2 receives the second data X5 and the third data X6. The second data X5 is data obtained after 3 pieces of first data, namely, X1, X2, and X3, are encoded, that is, the second data X5 is data obtained after N=3 pieces of first data (X1, X2, and X3) are encoded. The third data X6 is data obtained after 2 pieces of first data, namely, X1 and X4, are encoded, that is, the third data X6 is data obtained after K=2 pieces of first data (X1 and X4) are encoded. For example, the second data X5 satisfies a coding relationship X5=X1⊕X2⊕X3, the third data X6 satisfies a coding relationship X6=X1⊕X4, and a union set of the N=3 pieces of first data (X1, X2, and X3) and the K=2 pieces of first data (X1 and X4) constitutes a set of R=4 pieces of first data (X1, X2, X3, and X4).

With reference to the foregoing implementations, in part 320, U2 decodes the second data X5 by using the L2=2 pieces of first data (X1 and X3) in the L1=2 pieces of first data (X1 and X3), and decodes the third data X6 by using X1 in the L2=2 pieces of first data (X1 and X3), to obtain L3=2 pieces of first data (X2 and X4) that are in the L=4 pieces of first data (X1, X2, X3, and X4) and that are different from the L1=2 pieces of first data (X1 and X3). For example, U2 decodes the second data X5=X1⊕X2⊕X3 by using the L2=2 pieces of first data (X1 and X3) to perform the following decoding operation: (X1⊕X3) ⊕X5=(X1⊕X3) ⊕(X1⊕X2⊕X3)=X2, and decodes the third data X6=X1⊕X4 by using X1 in the L2=2 pieces of first data (X1 and X3) to perform the following decoding operation: X1⊕X6=X1⊕(X1⊕X4)=X4, to obtain the L3=2 pieces of first data (X2 and X4) that are in the L=4 pieces of first data (X1, X2, X3, and X4) and that are different from the L1=2 pieces of first data (X1 and X3). The L2=2 pieces of first data (X1 and X3) are included in the set of R=4 pieces of first data (X1, X2, X3, and X4).

With reference to the foregoing implementations, U2 generates feedback information indicating one or more reception statuses for M pieces of first data, where the M pieces of first data are included in the L=4 pieces of first data, and M is a positive integer less than or equal to L.

In a possible implementation of the feedback information, U2 generates feedback information indicating that the L3=2 pieces of first data (X2 and X4) are correctly received, where M=L3=2. For example, that the feedback information includes the identifiers corresponding to X2 and X4 is used as an example. The identifiers of the L=4 pieces of first data schematically shown in Table 2 are used as an example. The feedback information includes bits "0111". The first two bits indicate an identifier "01" of X2, and the last two bits indicate an identifier "11" of X4.

In another possible implementation of the feedback information, U2 generates feedback information indicating that the L1+L3=2+2=4 pieces of first data (X1 and X3, and X2 and X4) are correctly received, where M=L1+L3=4. For example, that the feedback information includes the identifiers corresponding to X1, X2, X3, and X4 is used as an example. The identifiers of the L=4 pieces of first data schematically shown in Table 2 are used as an example. The feedback information includes bits "00011011", where the first two bits indicate an identifier "00" of X1, the third and fourth bits indicate an identifier "01" of X2, the fifth and sixth bits indicate an identifier "10" of X3, and the last two bits indicate an identifier "11" of X4.

In another possible implementation of the feedback information, U2 generates feedback information indicating that the L1+L3=2+2=4 pieces of first data (X1, X3, X2, and X4) are correctly received and feedback information indicating that the L−L1−L3=4−2−2=0 pieces of first data are not correctly received, where M2=L1+L3=4, M1=L−L1−L3=0, and M=M1+M2=4. For example, the feedback information includes a bitmap whose length is M=4. The bitmap may be "1111", and the four bits "1" represent that X1, X2, X3, and X4 are correctly received. The bitmap may alternatively be "0000", where the four bits "0" represent that X1, X2, X3, and X4 are correctly received.

It may be understood that, in the foregoing implementations, U2 does not generate the feedback information when receiving the second data X5, but generates the feedback information after receiving the third data X6. Optionally, in part 330, U2 sends the feedback information in the time unit identified as T1. T1 satisfies T1=T2+T0, T1=(T2+T0) mod TN, T1=T3+T0, or T1=(T3+T0) mod TN, where T3 identifies a time unit in which the first communication device receives the third data X6. For another parameter, refer to the foregoing descriptions of part 330.

The correspondences shown in the foregoing tables may be configured, or may be predefined. Values of the information in the tables are merely examples, and other values may be configured. This is not limited in this application. When a correspondence between information and each parameter is configured, not all correspondences schematically shown in the tables need to be configured. For example, in the foregoing tables, correspondences shown in some rows may not be configured. For another example, proper transformation and adjustments such as splitting and combination may be performed based on the foregoing tables. Names of the parameters shown in titles of the foregoing tables may alternatively be other names that can be understood by a communication device, and values or representation manners of the parameters may alternatively be other values or representation manners that can be understood by the communication device. During implementation of the foregoing tables, another data structure, such as an array, a queue, a container, a stack, a linear table, a pointer, a linked list, a tree, a graph, a structure, a class, a pile, or a hash table, may be used.

Predefining in this application may be understood as "define", "predefine", "store", "pre-store", "pre-negotiate", "pre-configure", "solidify", or "pre-burn".

The description in this application that a and b satisfy a relationship (which may also be understood as a functional relationship) does not forcibly require that a and b precisely satisfy the relationship. For example, if a value a' and the value b precisely satisfy the relationship, a value a obtained after an operation of floating-point removal, rounding, or rounding off is performed on the value a' may also be understood as that a and b satisfy the relationship. It may be understood that, that a and b satisfy a relationship may alternatively be that a and b satisfy a relationship obtained after equivalent transformation is performed on the relationship. This is not limited in the embodiments of this application. In addition, it may be understood that a specific implementation in which a and b satisfy a relationship is not limited in the embodiments of this application. For example, the mapping manner may be implemented by using a formula, or the mapping manner may be implemented in a form of a table, or the mapping manner may be implemented in another manner. This is not limited in the embodiments of this application.

It may be understood that the methods implemented by the communication device in the foregoing method embodiments may alternatively be implemented by a component (for example, an integrated circuit or a chip) that can be used in the communication device.

In correspondence to the wireless communication methods provided in the foregoing method embodiments, an embodiment of this application further provides a corresponding communication apparatus (which may also be referred to as a communication device). The communication apparatus includes a corresponding module configured to perform each part in the foregoing embodiments. The module may be software, hardware, or a combination of software and hardware.

Figure 5:
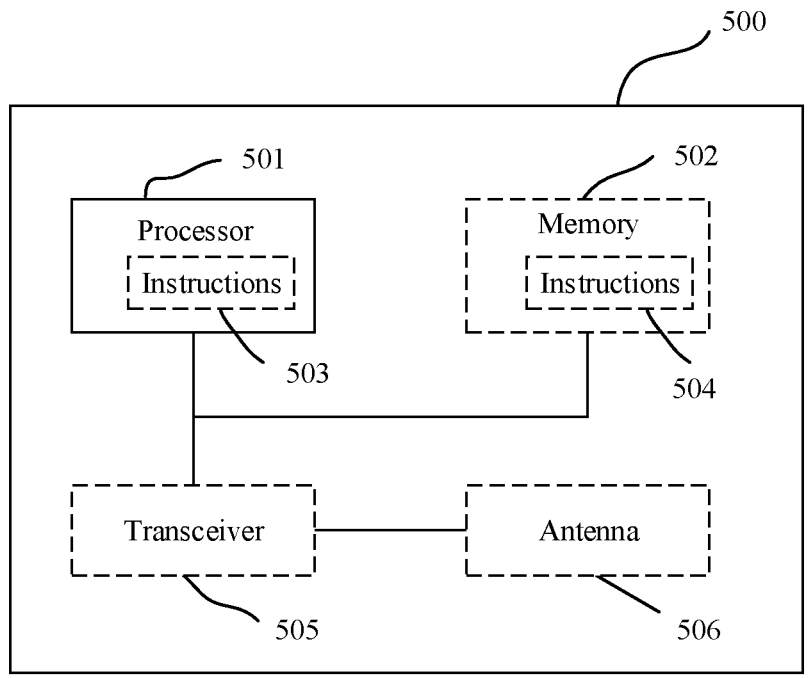
FIG. 5 is a schematic structural diagram of a communication apparatus according to an embodiment of this application.

FIG. 5 is a schematic structural diagram of a communication apparatus. The communication apparatus 500 may be the network device 10 or 20 in FIG. 1, or may be the terminal device 11, 12, 21, or 22 in FIG. 1. The communication apparatus may be configured to implement a method corresponding to a communication device or a node described in the foregoing method embodiments. For details, refer to the descriptions in the foregoing method embodiments.

The communication apparatus 500 may include one or more processors 501. The processor 501 may also be referred to as a processing unit, and may implement a specific control function. The processor 501 may be a general-purpose processor, a dedicated processor, or the like. For example, the processor 501 may be a baseband processor or a central processing unit. The baseband processor may be configured to process a communication protocol and communication data. The central processing unit may be configured to: control the communication apparatus (for example, a base station, a baseband chip, a DU, or a CU), execute a software program, and process data of the software program.

In an optional design, the processor 501 may also store instructions and/or data 503. The instructions and/or data 503 may be run by the processor, so that the communication apparatus 500 performs a method that corresponds to the communication device and that is described in the foregoing method embodiments.

In another optional design, the processor 501 may include a transceiver unit configured to implement receiving and sending functions. For example, the transceiver unit may be a transceiver circuit or an interface. A circuit or an interface configured to implement the receiving function and a circuit or an interface configured to implement the sending function may be separated or may be integrated together.

In still another possible design, the communication apparatus 500 may include a circuit, and the circuit may implement a sending function, a receiving function, or a communication function in the foregoing method embodiments.

Optionally, the communication apparatus 500 may include one or more memories 502. The memory stores instructions 504, and the instructions may be run on the processor, so that the communication apparatus 500 performs a method described in the foregoing method embodiments. Optionally, the memory may further store data. Optionally, the processor may further store instructions and/or data. The processor and the memory may be separately disposed, or may be integrated together. For example, various correspondences described in the foregoing method embodiments may be stored in the memory, or may be stored in the processor.

The communication apparatus 500 may further include a transceiver 505 and/or an antenna 506. The processor 501 may be referred to as a processing unit, and controls the communication apparatus (a terminal or a network device). The transceiver 505 may be referred to as a transceiver unit, a transceiver machine, a transceiver circuit, a transceiver, or the like, and is configured to implement the receiving and sending functions of the communication apparatus.

In a possible design, a communication apparatus 500 (for example, an integrated circuit, a wireless device, a circuit module, a network device, or a terminal) may include a processor 501 and a transceiver 505. The transceiver 505 receives L pieces of first data, and the processor 501 determines reception statuses for the L pieces of first data, where L is an integer greater than 1. The transceiver 505 receives second data, and the processor 501 generates feedback information based on the reception statuses for the L pieces of first data and the second data, where the feedback information indicates one or more reception statuses for M pieces of first data, the M pieces of first data are included in the L pieces of first data, and M is a positive integer less than or equal to L. The second data is data obtained after N pieces of first data are encoded, the N pieces of first data are included in the L pieces of first data, and N is a positive integer less than or equal to L. The feedback information is sent by the transceiver 505.

The communication apparatus provided in this embodiment of this application may feed back a reception status for original data (namely, the first data) in coded data (namely, the second data). Therefore, richer feedback information can be provided for a send node that sends the coded data, so that the send node can more properly organize to-be-sent data in subsequent data sending, to reduce unnecessary retransmission and improve data transmission efficiency.

In some possible implementations of the communication apparatus 500, the feedback information indicates that the communication apparatus 500 correctly receives the M pieces of first data.

Optionally, when determining the reception statuses for the L pieces of first data, the processor 501 determines that the L1 pieces of first data are correctly received, where L1 is a positive integer less than or equal to L. The processor 501 uses L2 pieces of first data in the L1 pieces of first data to decode the second data received by the transceiver 505, to obtain L3 pieces of first data that are in the L pieces of first data and that are different from the L1 pieces of first data, where the L2 pieces of first data are included in the N pieces of first data, L2 is a positive integer less than or equal to L1, L3 is a nonnegative integer less than or equal to L, and a sum of L1 and L3 is less than or equal to L. The processor 501 generates feedback information indicating that the L3 pieces of first data are correctly received, where L3=M; or the processor 501 generates feedback information indicating that the L1+L3 pieces of first data are correctly received, where L1+L3=M. Optionally, L2 and L3 satisfy L2+L3=N. Optionally, L2 and L3 satisfy L3=1, and L2=N−1.

In some possible implementations of the communication apparatus 500, the feedback information indicates that the communication apparatus 500 does not correctly receive M1 pieces of first data, and indicates that the communication apparatus 500 correctly receives M2 pieces of first data, where M1 and M2 are integers greater than or equal to 0, and M1+M2=M.

Optionally, when determining the reception statuses for the L pieces of first data, the processor 501 determines that the L1 pieces of first data are correctly received, where L1 is a positive integer less than or equal to L. The processor 501 uses L2 pieces of first data in the L1 pieces of first data to decode the second data received by the transceiver 505, to obtain L3 pieces of first data that are in the L pieces of first data and that are different from the L1 pieces of first data, where the L2 pieces of first data are included in the N pieces of first data, L2 is a positive integer less than or equal to L1, L3 is a nonnegative integer less than or equal to L, and a sum of L1 and L3 is less than or equal to L. The processor 501 generates feedback information indicating that the L3 pieces of first data are correctly received and feedback information indicating that L−L1−L3 pieces of first data are not correctly received, where L3=M2, and L−L1−L3=M1; or the processor 501 generates feedback information indicating that the L1+L3 pieces of first data are correctly received and feedback information indicating that L−L1−L3 pieces of first data are not correctly received, where L1+L3=M2, and L−L1−L3=M1. Optionally, L2 and L3 satisfy L2+L3=N. Optionally, L2 and L3 satisfy L3=1, and L2=N−1.

In some possible implementations of the communication apparatus 500, the feedback information indicates that the communication device does not correctly receive the M pieces of first data.

With reference to any one of the communication apparatus 500 or the possible implementations of the communication apparatus 500, in some possible implementations of the communication apparatus 500, the transceiver 505 receives the second data and at least one piece of third data, where the third data is data obtained after K pieces of first data are encoded, the K pieces of first data are included in the L pieces of first data, and K is a positive integer less than or equal to L. The processor 501 generates the feedback information based on the reception statuses for the L pieces of first data, the second data, and the at least one piece of third data. Optionally, the communication apparatus 500 receives the second data and the at least one piece of third data based on identification information.

With reference to any one of the communication apparatus 500 or the possible implementations of the communication apparatus 500, in some possible implementations of the communication apparatus 500, the transceiver 505 sends the feedback information in a time unit identified as T1, where T1 satisfies T1=(T2+T0) mod TN, T2 identifies a time unit in which the communication device receives the second data, T0 and TN are positive integers, and mod represents modulo.

With reference to any one of the communication apparatus 500 or the possible implementations of the communication apparatus 500, in some possible implementations of the communication apparatus 500, the transceiver 505 receives indication information, where the indication information is used to indicate the communication apparatus 500 to send the feedback information.

When the indication information in the foregoing implementation is used, different data acknowledgement feedback formats may be used for different types of transport blocks, so that a transmission resource can be saved, and the transmission efficiency can be improved.

In another possible design, a communication apparatus 500 (for example, an integrated circuit, a wireless device, a circuit module, a network device, or a terminal) may include a transceiver 505. The transceiver 505 sends L pieces of first data, where L is an integer greater than 1. The transceiver 505 sends second data, where the second data is data obtained after N pieces of first data are encoded, the N pieces of first data are included in the L pieces of first data, and N is a positive integer less than or equal to L. The transceiver 505 receives feedback information, where the feedback information indicates one or more reception statuses for M pieces of first data, the M pieces of first data are included in the L pieces of first data, and M is a positive integer less than or equal to L.

In a method provided in the embodiments of this application, the communication apparatus may obtain a reception status for original data (namely, the first data) in coded data (namely, the second data). Therefore, the communication apparatus can more properly organize to-be-sent data in subsequent data sending, to reduce unnecessary retransmission and improve data transmission efficiency.

In some possible implementations of the communication apparatus 500, the feedback information indicates that the M pieces of first data are not correctly received.

In some possible implementations of the communication apparatus 500, the feedback information indicates that the M pieces of first data are correctly received.

In some possible implementations of the communication apparatus 500, the feedback information indicates that M1 pieces of first data are not correctly received, and indicates that M2 pieces of first data are correctly received, where M1 and M2 are integers greater than or equal to 0, and M1+M2=M.

With reference to any one of the communication apparatus 500 or the possible implementations of the communication apparatus 500, in some possible implementations of the communication apparatus 500, the transceiver 505 sends the second data and at least one piece of third data, where the third data is data obtained after K pieces of first data are encoded, the K pieces of first data are included in the L pieces of first data, and K is a positive integer less than or equal to L. Optionally, the communication apparatus 500 further includes a processor 501. The processor 501 processes the second data and the at least one piece of third data by using identification information.

With reference to any one of the communication apparatus 500 or the possible implementations of the communication apparatus 500, in some possible implementations of the communication apparatus 500, the transceiver 505 receives feedback information in a time unit identified as T1, where T1 satisfies T1=(T2+T0) mod TN, T2 identifies a time unit in which the communication device sends the second data, T0 and TN are positive integers, and mod represents modulo.

With reference to any one of the communication apparatus 500 or the possible implementations of the communication apparatus 500, in some possible implementations of the communication apparatus 500, the transceiver 505 sends indication information, where the indication information is used to request or trigger the feedback information.

When the indication information in the foregoing implementation is used, different data acknowledgement feedback formats may be used for different types of transport blocks, so that a transmission resource can be saved, and the transmission efficiency can be improved.

The processor and the transceiver described in this application may be implemented on an integrated circuit (integrated circuit, IC), an analog IC, a radio frequency integrated circuit RFIC, a hybrid signal IC, an application-specific integrated circuit (application specific integrated circuit, ASIC), a printed circuit board (printed circuit board, PCB), an electronic device, or the like. The processor and the transceiver may alternatively be manufactured by using various IC process technologies, for example, a complementary metal oxide semiconductor (complementary metal oxide semiconductor, CMOS), an N-type metal oxide semiconductor (nMetal-oxide-semiconductor, NMOS), a P-type metal oxide semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

In the descriptions of the foregoing embodiments, the communication apparatus is described by using the network device or the terminal as an example. However, a scope of the communication apparatus described in this application is not limited to the example, and a structure of the communication apparatus may not be limited by FIG. 5. The communication apparatus may be an independent device or may be a part of a relatively large device. For example, the device may be:

(1) an independent integrated circuit IC, a chip, or a chip system or subsystem;
(2) a set including one or more ICs, where optionally, the IC set may further include a storage component configured to store data and/or instructions;
(3) an ASIC, for example, a modem (MSM);
(4) a module that can be embedded in another device;

(5) a receiver, a terminal, an intelligent terminal, a cellular phone, a wireless device, a handheld phone, a mobile unit, a vehicle-mounted device, a network device, a cloud device, an artificial intelligence device, or the like; or (6) another device, or the like.

Figure 6:
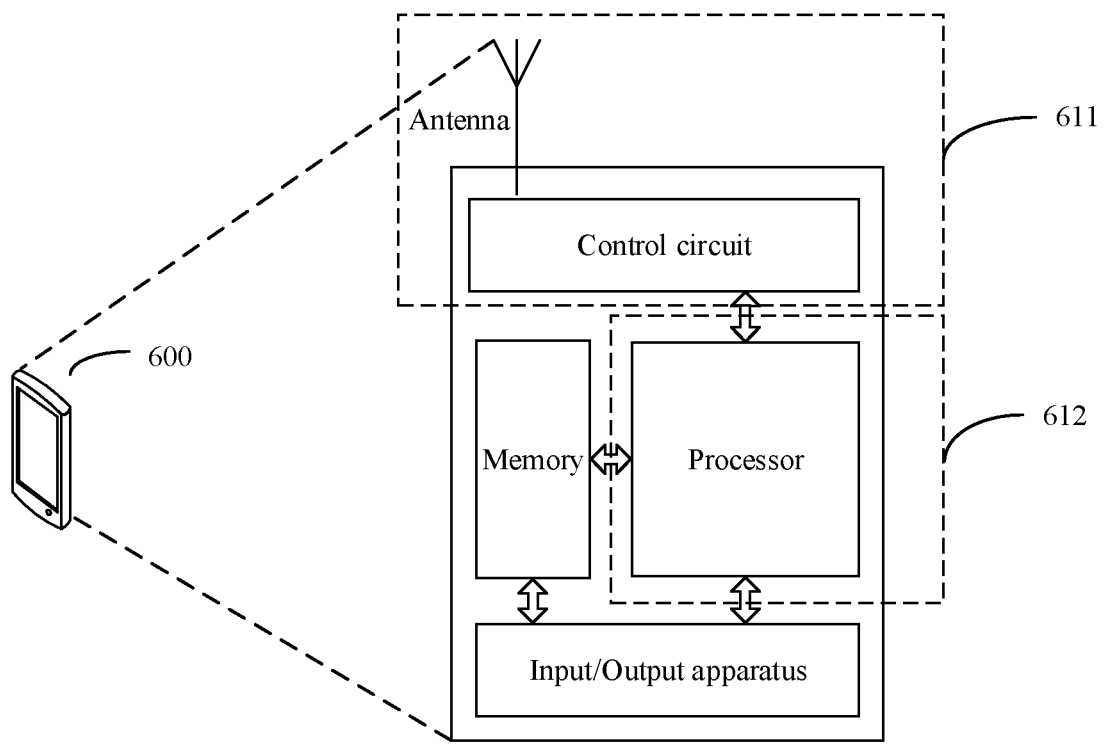
FIG. 6 is a schematic structural diagram of a terminal according to an embodiment of this application.

FIG. 6 is a schematic structural diagram of a terminal. The terminal is applicable to the system shown in FIG. 1. For ease of description, FIG. 6 shows only main parts of the terminal. As shown in FIG. 6, the terminal 600 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. A radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display, or a keyboard is mainly configured to receive data entered by a user and output data to the user.

After user equipment is powered on, the processor may read a software program stored in a storage unit, parse and execute an instruction of the software program, and process data of the software program. When data needs to be sent wirelessly, after performing baseband processing on the to-be-sent data, the processor outputs a baseband signal to the radio frequency circuit. After processing the baseband signal, the radio frequency circuit obtains a radio frequency signal and sends the radio frequency signal to the outside through the antenna in a form of an electromagnetic wave. When data is sent to the user equipment, the radio frequency circuit receives a radio frequency signal through the antenna, further converts the radio frequency signal into a baseband signal, and outputs the baseband signal to the processor, and the processor converts the baseband signal into data and processes the data.

A person skilled in the art may understand that for ease of description, FIG. 6 shows only one memory and only one processor. An actual terminal may include a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data, and the central processing unit is mainly configured to: control the entire terminal, execute the software program, and process the data of the software program. The processor in FIG. 6 integrates functions of the baseband processor and the central processing unit. A person skilled in the art may understand that the baseband processor and the central processing unit may be processors independent of each other, and are interconnected by using technologies such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna and the control circuit that have receiving and sending functions may be considered as a transceiver unit 611 of the terminal 600, and the processor having a processing function may be considered as a processing unit 612 of the terminal 600. As shown in FIG. 6, the terminal 600 includes the transceiver unit 611 and the processing unit 612. The transceiver unit may also be referred to as a transceiver, a transceiver machine, a transceiver apparatus, or the like. Optionally, a component that is in the transceiver unit 611 and that is configured to implement a receiving function may be considered as a receiving unit, and a component that is in the transceiver unit 611 and that is configured to implement a sending function may be considered as a sending unit. In other words, the transceiver unit 611 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like. Optionally, the receiving unit and the sending unit may be integrated into one unit, or may be a plurality of units independent of each other. The receiving unit and the sending unit may be at one geographical location, or may be scattered at a plurality of geographical locations.

Figure 7:
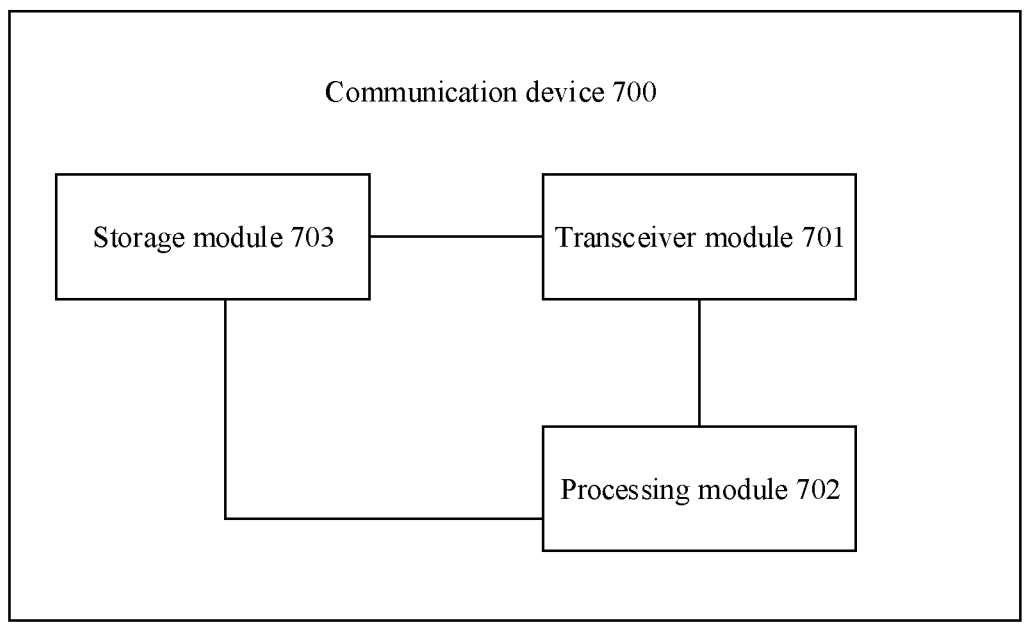
FIG. 7 is a schematic diagram of a communication device according to an embodiment of this application.

As shown in FIG. 7, another embodiment of this application provides a communication apparatus (communication device) 700. The communication apparatus may be a terminal (for example, a terminal in the system shown in FIG. 1) or a component (for example, an integrated circuit or a chip) of a terminal. Alternatively, the communication apparatus may be a network device (where for example, the communication apparatus is a base station device that can be used in the system in FIG. 1) or a component (for example, an integrated circuit or a chip) of a network device. Alternatively, the communication apparatus may be another communication module, configured to implement an operation corresponding to a communication device or node in the method embodiments of this application. The communication apparatus 700 may include a processing module 702 (a processing unit). The communication apparatus 700 may further include a transceiver module 701 (transceiver unit) and/or a storage module 703 (storage unit).

In a possible design, one or more modules in FIG. 7 may be implemented by one or more processors, may be implemented by one or more processors and memories, may be implemented by one or more processors and transceivers, or may be implemented by one or more processors, memories, and transceivers. This is not limited in the embodiments of this application. The processor, the memory, and the transceiver may be separately disposed, or may be integrated together.

The communication apparatus has a function of implementing the terminal described in the embodiments of this application. For example, the communication apparatus includes modules, units, or means (means) that are of the terminal and that correspond to the steps performed by the terminal described in the embodiments of this application, and the functions, units, or means (means) may be implemented by software, may be implemented by hardware, or may be implemented by hardware executing corresponding software. For details, refer to corresponding descriptions in the foregoing corresponding method embodiments.

Alternatively, the communication apparatus has a function of implementing the network device described in the embodiments of this application. For example, the communication apparatus includes corresponding modules, units, or means (means) used by the network device to perform network device-related steps described in the embodiments of this application, and the functions, units, or means (means) may be implemented by software, may be implemented by hardware, or may be implemented by hardware executing corresponding software. For details, refer to corresponding descriptions in the foregoing corresponding method embodiments.

Optionally, the modules in the communication apparatus 700 in this embodiment of this application may be configured to perform the method described in FIG. 3 in the embodiments of this application.

In a possible design, a communication apparatus 700 may include a transceiver module 701 and a processing module 702. The transceiver module 701 receives L pieces of first data, and the processing module 702 determines reception statuses for the L pieces of first data, where L is an integer greater than 1. The transceiver module 701 receives second data, and the processing module 702 generates feedback information based on the reception statuses for the L pieces of first data and the second data, where the feedback information indicates one or more reception statuses for M pieces of first data, the M pieces of first data are included in the L pieces of first data, and M is a positive integer less than or equal to L. The second data is data obtained after N pieces of first data are encoded, the N pieces of first data are included in the L pieces of first data, and N is a positive integer less than or equal to L. The feedback information is sent by the transceiver module 701.

The communication apparatus provided in this embodiment of this application may feed back a reception status for original data (namely, the first data) in coded data (namely, the second data). Therefore, richer feedback information can be provided for a send node that sends the coded data, so that the send node can more properly organize to-be-sent data in subsequent data sending, to reduce unnecessary retransmission and improve data transmission efficiency.

In some possible implementations of the communication apparatus 700, the feedback information indicates that the communication apparatus 700 correctly receives the M pieces of first data.

Optionally, when determining the reception statuses for the L pieces of first data, the processing module 702 determines that the L1 pieces of first data are correctly received, where L1 is a positive integer less than or equal to L. The processing module 702 uses L2 pieces of first data in the L1 pieces of first data to decode the second data received by the transceiver module 701, to obtain L3 pieces of first data that are in the L pieces of first data and that are different from the L1 pieces of first data, where the L2 pieces of first data are included in the N pieces of first data, L2 is a positive integer less than or equal to L1, L3 is a nonnegative integer less than or equal to L, and a sum of L1 and L3 is less than or equal to L. The processing module 702 generates feedback information indicating that the L3 pieces of first data are correctly received, where L3=M; or the processing module 702 generates feedback information indicating that the L1+L3 pieces of first data are correctly received, where L1+L3=M. Optionally, L2 and L3 satisfy L2+L3=N. Optionally, L2 and L3 satisfy L3=1, and L2=N−1.

In some possible implementations of the communication apparatus 700, the feedback information indicates that the communication apparatus 700 does not correctly receive M1 pieces of first data, and indicates that the communication apparatus 700 correctly receives M2 pieces of first data, where M1 and M2 are integers greater than or equal to 0, and M1+M2=M.

Optionally, when determining the reception statuses for the L pieces of first data, the processing module 702 determines that the L1 pieces of first data are correctly received, where L1 is a positive integer less than or equal to L. The processing module 702 uses L2 pieces of first data in the L1 pieces of first data to decode the second data received by the transceiver module 701, to obtain L3 pieces of first data that are in the L pieces of first data and that are different from the L1 pieces of first data, where the L2 pieces of first data are included in the N pieces of first data, L2 is a positive integer less than or equal to L1, L3 is a nonnegative integer less than or equal to L, and a sum of L1 and L3 is less than or equal to L. The processing module 702 generates feedback information indicating that the L3 pieces of first data are correctly received and feedback information indicating that L−L1−L3 pieces of first data are not correctly received, where L3=M2, and L−L1−L3=M1; or the processing module 702 generates feedback information indicating that the L1+L3 pieces of first data are correctly received and feedback information indicating that L−L1−L3 pieces of first data are not correctly received, where L1+L3=M2, and L−L1−L3=M1. Optionally, L2 and L3 satisfy L2+L3=N. Optionally, L2 and L3 satisfy L3=1, and L2=N−1.

In some possible implementations of the communication apparatus 700, the feedback information indicates that the communication device does not correctly receive the M pieces of first data.

With reference to any one of the communication apparatus 700 or the possible implementations of the communication apparatus 700, in some possible implementations of the communication apparatus 700, the transceiver module 701 receives the second data and at least one piece of third data, where the third data is data obtained after K pieces of first data are encoded, the K pieces of first data are included in the L pieces of first data, and K is a positive integer less than or equal to L. The processing module 702 generates the feedback information based on the reception statuses for the L pieces of first data, the second data, and the at least one piece of third data. Optionally, the communication apparatus 700 receives the second data and the at least one piece of third data based on identification information.

With reference to any one of the communication apparatus 700 or the possible implementations of the communication apparatus 700, in some possible implementations of the communication apparatus 700, the transceiver module 701 sends the feedback information in a time unit identified as T1, where T1 satisfies T1=(T2+T0) mod TN, T2 identifies a time unit in which the communication device receives the second data, T0 and TN are positive integers, and mod represents modulo.

With reference to any one of the communication apparatus 700 or the possible implementations of the communication apparatus 700, in some possible implementations of the communication apparatus 700, the transceiver module 701 receives indication information, where the indication information is used to indicate the communication apparatus 700 to send the feedback information.

When the indication information in the foregoing implementation is used, different data acknowledgement feedback formats may be used for different types of transport blocks, so that a transmission resource can be saved, and the transmission efficiency can be improved.

In another possible design, a communication apparatus 700 may include a transceiver module 701. The transceiver module 701 sends L pieces of first data, where L is an integer greater than 1. The transceiver module 701 sends second data, where the second data is data obtained after N pieces of first data are encoded, the N pieces of first data are included in the L pieces of first data, and N is a positive integer less than or equal to L. The transceiver module 701 receives feedback information, where the feedback information indicates one or more reception statuses for M pieces of first data, the M pieces of first data are included in the L pieces of first data, and M is a positive integer less than or equal to L.

In a method provided in the embodiments of this application, the communication apparatus may obtain a reception status for original data (namely, the first data) in coded data (namely, the second data). Therefore, the communication apparatus can more properly organize to-be-sent data in subsequent data sending, to reduce unnecessary retransmission and improve data transmission efficiency.

In some possible implementations of the communication apparatus 700, the feedback information indicates that the M pieces of first data are not correctly received.

In some possible implementations of the communication apparatus 700, the feedback information indicates that the M pieces of first data are correctly received.

In some possible implementations of the communication apparatus 700, the feedback information indicates that M1 pieces of first data are not correctly received, and indicates that M2 pieces of first data are correctly received, where M1 and M2 are integers greater than or equal to 0, and M1+M2=M.

With reference to any one of the communication apparatus 700 or the possible implementations of the communication apparatus 700, in some possible implementations of the communication apparatus 700, the transceiver module 701 sends the second data and at least one piece of third data, where the third data is data obtained after K pieces of first data are encoded, the K pieces of first data are included in the L pieces of first data, and K is a positive integer less than or equal to L. Optionally, the communication apparatus 700 further includes a processing module 702. The processing module 702 processes the second data and the at least one piece of third data by using identification information.

With reference to any one of the communication apparatus 700 or the possible implementations of the communication apparatus 700, in some possible implementations of the communication apparatus 700, the transceiver module 701 receives feedback information in a time unit identified as T1, where T1 satisfies T1=(T2+T0) mod TN, T2 identifies a time unit in which the communication device sends the second data, T0 and TN are positive integers, and mod represents modulo.

With reference to any one of the communication apparatus 700 or the possible implementations of the communication apparatus 700, in some possible implementations of the communication apparatus 700, the transceiver module 701 sends indication information, where the indication information is used to request or trigger the feedback information.

When the indication information in the foregoing implementation is used, different data acknowledgement feedback formats may be used for different types of transport blocks, so that a transmission resource can be saved, and the transmission efficiency can be improved.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in the embodiments of this application may also correspondingly implement these features or functions. Details are not described herein.

A person skilled in the art may further understand that various illustrative logical blocks (illustrative logic block) and steps (step) that are listed in the embodiments of this application may be implemented by using electronic hardware, computer software, or a combination thereof. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of this application.

The technologies described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general purpose processors, a digital signal processor (DSP), a digital signal processing device (DSPD), an application-specific integrated circuit (ASIC), a programmable logic device (PLD), a field-programmable gate array (FPGA), or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

A person of ordinary skill in the art may understand that various reference numerals such as "first" and "second" in this application are merely used for differentiation for ease of description, and are not used to limit the scope of the embodiments of this application, or represent a sequence. The term "and/or" describes an association relationship between associated objects and represents that three relationships may exist. For example, A and/or B may represent the following three cases: Only A exists, both A and B exist, and only B exists. The character "/" usually represents an "or" relationship between the associated objects. The term "at least one" means one or more. The term "at least two" means two or more. The term "at least one", "any one", or a similar expression thereof means any combination of these items, including a single item (piece) or any combination of a plurality of items (pieces). For example, at least one (piece, or type) of a, b, or c may represent: a, b, c, a and b, a and c, b and c, or a, b, and c, where a, b, and c may be singular or plural.

Steps of the methods or algorithms described in the embodiments of this application may be directly embedded into hardware, an instruction executed by a processor, or a combination thereof. The memory may be a RAM memory, a flash memory, a ROM memory, an EPROM memory, an EEPROM memory, a register, a hard disk, a removable magnetic disk, a CD-ROM, or a storage medium of any other form in the art. For example, the memory may connect to a processor, so that the processor may read information from the memory and write information to the memory. Optionally, the memory may further be integrated into the processor. The processor and the memory may be disposed in an ASIC, and the ASIC may be disposed in a terminal. Optionally, the processor and the memory may alternatively be disposed in different components of a terminal.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer instructions. When the computer program instructions are loaded and executed on a computer, a procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data packet storage device, such as a server or a data packet center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like. The foregoing combination should also be included in the protection scope of the computer-readable medium.

For same or similar parts in the embodiments of this application, refer to each other. In the embodiments of this application and the implementations/implementation methods/implementation methods in the embodiments, unless otherwise specified or a logical conflict occurs, terms and/or descriptions are consistent and may be mutually referenced between different embodiments and between the implementations/implementation methods/implementation methods in the embodiments. Technical features in the different embodiments and the implementations/implementation methods/implementation methods in the embodiments may be combined to form a new embodiment, implementation, implementation method, or implementation method according to an internal logical relationship thereof. The foregoing descriptions are implementations of this application, but are not intended to limit the protection scope of this application.

What is claimed is:

1. An apparatus, comprising:
one or more processors;
a memory coupled to the one or more processors, wherein the non-transitory memory stores a program to be executed by the one or more processors, the program including instructions to:
receive L pieces of first data, wherein L is an integer greater than 1;
determine a reception statuses for the L pieces of first data;
receive second data, wherein the second data is data obtained after N pieces of first data are encoded, the N pieces of first data are included in the L pieces of first data, and N is a positive integer less than or equal to L, wherein the receiving the second data comprises: decoding the second data by using L2 pieces of first data in the L1 pieces of first data, to obtain L3 pieces of first data that are in the L pieces of first data and that are different from the L1 pieces of first data, wherein the L2 pieces of first data are included in the N pieces of first data, L2 is a positive integer less than or equal to L1, L3 is a nonnegative integer less than or equal to L, and a sum of L1 and L3 is less than or equal to L;
generate feedback information based on the reception statuses for the L pieces of first data and the second data, wherein the feedback information indicates one or more reception statuses for M pieces of first data, the M pieces of first data are included in the L pieces of first data, and M is a positive integer less than or equal to L, wherein the feedback information comprises first feedback information or second feedback information, wherein the first feedback information indicates that the L3 pieces of first data are correctly received, L3=M; wherein the second feedback information indicates that the L1+L3 pieces of first data are correctly received, L1+L3=M; and
send the feedback information.

2. The apparatus according to claim 1, wherein that the feedback information indicates one or more reception statuses for M pieces of first data comprises: the feedback information indicates that the M pieces of first data is not correctly received by the apparatus.

3. The apparatus according to claim 1, wherein that the feedback information indicates one or more reception statuses for M pieces of first data comprises: the feedback information indicates that the M pieces of first data is correctly received.

4. The apparatus according to claim 1, wherein that the feedback information indicates one or more reception statuses for M pieces of first data comprises: the feedback information indicates that M1 pieces of first data is not correctly received, and indicates that M2 pieces of first data is correctly received, wherein the M2 pieces of first data is different from the M1 pieces of first data, M1 and M2 are integers greater than or equal to 0, and M1+M2=M.

5. The apparatus according to claim 1, wherein in case that the first feedback information is generated, the program further includes instructions to generate third feedback information indicating that L−L1−L3 pieces of first data are not correctly received, wherein L3=M2, and L−L1−L3=M1; or
in case that the second feedback information is generated, the program further includes instructions to generate fourth feedback information indicating that L−L1−L3 pieces of first data are not correctly received, wherein L1+L3=M2, and L−L1−L3=M1.

6. The apparatus according to claim 1, the program including instructions to receive at least one piece of third data, wherein the third data is data obtained after K pieces of first data are encoded, the K pieces of first data are comprised in the L pieces of first data, and K is a positive integer less than or equal to L and generate the feedback information based on the reception statuses for the L pieces of first data, the second data, and the at least one piece of third data.

7. A method, comprising:
receiving L pieces of first data, wherein L is an integer greater than 1;
determining reception statuses for the L pieces of first data, the determining the reception status comprising: determining that L1 pieces of first data are correctly received, wherein L1 is a positive integer less than or equal to L;
receiving second data, the receiving the second data comprising: decoding the second data by using L2 pieces of first data in the L1 pieces of first data, to obtain L3 pieces of first data that are in the L pieces of first data and that are different from the L1 pieces of first data, wherein the L2 pieces of first data are comprised in the N pieces of first data, L2 is a positive integer less than or equal to L1, L3 is a nonnegative integer less than or equal to L, and a sum of L1 and L3 is less than or equal to L, wherein the second data is data obtained after N pieces of first data are encoded, the N pieces of first data are comprised in the L pieces of first data, and N is a positive integer less than or equal to L;
generating feedback information based on the reception statuses for the L pieces of first data and the second data, wherein the feedback information indicates one or more reception statuses for M pieces of first data and comprises first feedback information or second feedback information, wherein the M pieces of first data are included in the L pieces of first data, and M is a positive integer less than or equal to L, wherein the first feedback information indicates that the L3 pieces of first data are correctly received, L3=M, wherein the second feedback information indicates that the L1+L3 pieces of first data are correctly received, L1+L3=M; and
sending the feedback information.

8. The method according to claim 7, wherein that the feedback information indicates one or more reception statuses for M pieces of first data comprises: the feedback information indicates that the M pieces of first data is not correctly received.

9. The method according to claim 7, wherein that the feedback information indicates one or more reception statuses for M pieces of first data comprises: the feedback information indicates that the M pieces of first data is correctly received.

10. The method according to claim 7, wherein that the feedback information indicates one or more reception statuses for M pieces of first data comprises: the feedback information indicates that M1 pieces of first data is not correctly received, and indicates that M2 pieces of first data is correctly received, wherein the M2 pieces of first data is different from the M1 pieces of first data, M1 and M2 are integers greater than or equal to 0, and M1+M2=M.

11. The method according to claim 7, wherein
in case that the first feedback information is generated, the feedback information further comprises third feedback information indicating that L−L1−L3 pieces of first data are not correctly received, L3=M2, and L−L1=L3=M1; or
in case that the second feedback information is generated, the feedback information further comprises fourth feedback information indicating that L−L1=L3 pieces of first data are not correctly received, L1+L3=M2, and L−L1=L3=M1.

12. The method according to claim 7, wherein the receiving second data comprises:
receiving at least one piece of third data, wherein the third data is data obtained after K pieces of first data are encoded, the K pieces of first data are comprised in the L pieces of first data, and K is a positive integer less than or equal to L; and
the generating feedback information based on the reception statuses for the L pieces of first data and the second data comprises:
generating the feedback information based on the reception statuses for the L pieces of first data, the second data, and the at least one piece of third data.

13. A non-transitory computer readable medium, wherein the non-transitory computer readable medium stores instructions that are executable by a computer, and the instructions comprise instructions for:
receiving L pieces of first data, and determining reception statuses for the L pieces of first data, the determining the reception statues comprising: determining that L1 pieces of first data are correctly received, wherein L1 is a positive integer less than or equal to L, L is an integer greater than 1;
receiving second data, wherein the second data is data obtained after N pieces of first data are encoded, the N pieces of first data are included in the L pieces of first data, and N is a positive integer less than or equal to L, wherein the receiving the second data comprises: decoding the second data by using L2 pieces of first data in the L1 pieces of first data, to obtain L3 pieces of first data that are in the L pieces of first data and that are different from the L1 pieces of first data, wherein the L2 pieces of first data are included in the N pieces of first data, L2 is a positive integer less than or equal to L1, L3 is a nonnegative integer less than or equal to L, and a sum of L1 and L3 is less than or equal to L; and
generating feedback information based on the reception statuses for the L pieces of first data and the second data, wherein the feedback information indicates one or more reception statuses for M pieces of first data, the M pieces of first data are included in the L pieces of first data, and M is a positive integer less than or equal to L, wherein the feedback information comprises first feedback information or second feedback information, wherein the first feedback information indicate that the L3 pieces of first data are correctly received, L3=M, wherein the second feedback information indicates that the L1+L3 pieces of first data are correctly received, L1+L3=M; and
sending the feedback information.

14. The non-transitory computer readable medium according to claim 13, wherein that the feedback information indicates one or more reception statuses for M pieces of first data comprises: the feedback information indicates that the M pieces of first data is not correctly received.

15. The non-transitory computer readable medium according to claim 13, wherein that the feedback information indicates one or more reception statuses for M pieces of first data comprises: the feedback information indicates that the M pieces of first data is correctly received.

16. The non-transitory computer readable medium according to claim 13, wherein that the feedback information indicates one or more reception statuses for M pieces of first data comprises: the feedback information indicates that M1 pieces of first data is not correctly received, and indicates that M2 pieces of first data is correctly received, wherein the M2 pieces of first data is different from the M1 pieces of first data, M1 and M2 are integers greater than or equal to 0, and M1+M2=M.

17. The non-transitory computer readable medium according to claim 13, wherein
- in case that the first feedback information is generated, the feedback information further comprises third feedback information indicating that the L3 pieces of first data are correctly received and feedback information indicating that L−L1−L3 pieces of first data are not correctly received,
- in case that the second feedback information is generated, the feedback information further comprises fourth feedback information indicating that L−L1=L3 pieces of first data are not correctly received, wherein L1+L3=M2, and L−L1=L3=M1.

* * * * *